United States Patent [19]

Sone et al.

[11] 4,037,953

[45] July 26, 1977

[54] CASSETTE LOADING APPARATUS

[75] Inventors: Yoshiaki Sone, Tokyo; Masanari Shirai, Chigasaki, both of Japan

[73] Assignee: Canon Kabushiki Kaisha, Tokyo, Japan

[21] Appl. No.: 674,302

[22] Filed: Apr. 6, 1976

[30] Foreign Application Priority Data

Apr. 10, 1975 Japan .................. 50-48733[U]

[51] Int. Cl.$^2$ .................................... G03B 13/28
[52] U.S. Cl. ..................... 355/45; 271/117; 271/164; 355/5
[58] Field of Search ............ 271/109, 117, 118, 162, 271/164, 170; 226/90; 355/3 R, 10, 5, 45

[56] References Cited

U.S. PATENT DOCUMENTS

| 3,599,971 | 8/1971 | Morioka | 271/162 X |
|---|---|---|---|
| 3,664,663 | 5/1972 | McPherson | 271/164 |
| 3,825,249 | 7/1974 | Zimmer | 271/109 |
| 3,871,754 | 3/1975 | Procop | 226/90 X |

Primary Examiner—Richard A. Schacher
Attorney, Agent, or Firm—Fitzpatrick, Cella, Harper & Scinto

[57] ABSTRACT

A cassette loading apparatus of a type which is basically constructed with a cassette receiving bed to enable the forward end of the cassette to move along a path defined on the receiving bed, from one end thereof to another, paper feeding rollers positioned in the cassette moving path on their own gravity and in a freely rotatable manner, and a lever is disposed at its one end in the cassette moving path, which contacts with a stack of the reproduction sheets in the cassette when the cassette moves along the path, and which lifts the paper feeding rollers until the center of rotation of the paper feeding rollers is positioned on the uppermost sheet in the cassette in the vertical direction in response to movement of the cassette, pawls disposed in the cassette for separating the sheet one at a time from the stack in the cassette, and a clutch to connect the paper feeding rollers to a driving source.

7 Claims, 6 Drawing Figures

CASSETTE LOADING APPARATUS

BACKGROUND OF THE INVENTION

1. Field of the Invention

This invention relates to an apparatus for loading a cassette containing therein a stack of sheet material for reproduction into a copying machine.

2. Description of the Prior Art

In copying or reproduction machines which have so far been widely used in various offices of firms, corporations, etc. material for reproduction such as paper is generally formed in sheets of a predetermined size, and a plurality of such sheets are fed one at a time into the copying machine, whereby an original image is reproduced thereon. Since the reproduction operation can be carried out continuously, a stack of sheet material is placed in a feed mechanism, out of which it is automatically fed sheet by sheet into the copying machine. When the stack of sheet material is completely used up, or when the paper sheets are to be loaded on or unloaded from the feeding mechanism to change the paper size, it is necessary to neatly arrange each sheet of the stack. For this purpose, it has generally been practiced to place the sheets in a cassette which is removable from the copying machine. When using the cassette if it becomes necessary to change the paper size, or to replenish the copying paper in the reproduction machine, an operator can simply replace the cassette.

When the cassette is loaded in the copying machine. a part of the stack of sheet material comes into contact with a feed mechanism. For instance, when feed rollers for feeding the sheets in the cassette contact with the stack of sheets during the cassette loading, there occur such difficulties that the edge of each sheet, praticularly that of the uppermost one, is bent, creased, or torn. Further, when such defective sheet is fed, it is wound around the roller, or broken. To avoid such troubles and difficulties, the conventional reproduction machine is constructed in such a manner that the feed mechansim may be removed, prior to the cassette loading to a position distant from a passage way, along which the cassette moves. In this construction, however, the removing device in the feed mechanism becomes complicated, and an additional device for maintaining the feed mechanism in a state of having been removed during the cassette loading is also required with the consequence that the apparatus as a whole becomes far more complicated.

SUMMARY OF THE INVENTION

It is, therefore, an object of the present invention to provide an improved apparatus for loading a stack of sheet material into a copying machine.

Another object of the invention is to automatically determine the position of feed rollers in response to loading of the sheet material.

Still another object of the invention is to provide an apparatus, in which the loading mechanism is extremely simple in construction.

Other object of the invention is to provide an apparatus which requires no mechanism for maintaining the feed rollers in a state of having been removed to a position apart from a traveling path of the cassette, when a stack of the sheet material is being loaded into the copying machine.

The foregoing objects, other objects, specific construction and operations of the cassette loading device according to the present invention will become more apparent from the following detailed description thereof, when read in conjunction with the accompanying drawing.

DESCRIPTION OF THE PREFERRED EMBODIMENT

Figure 1:
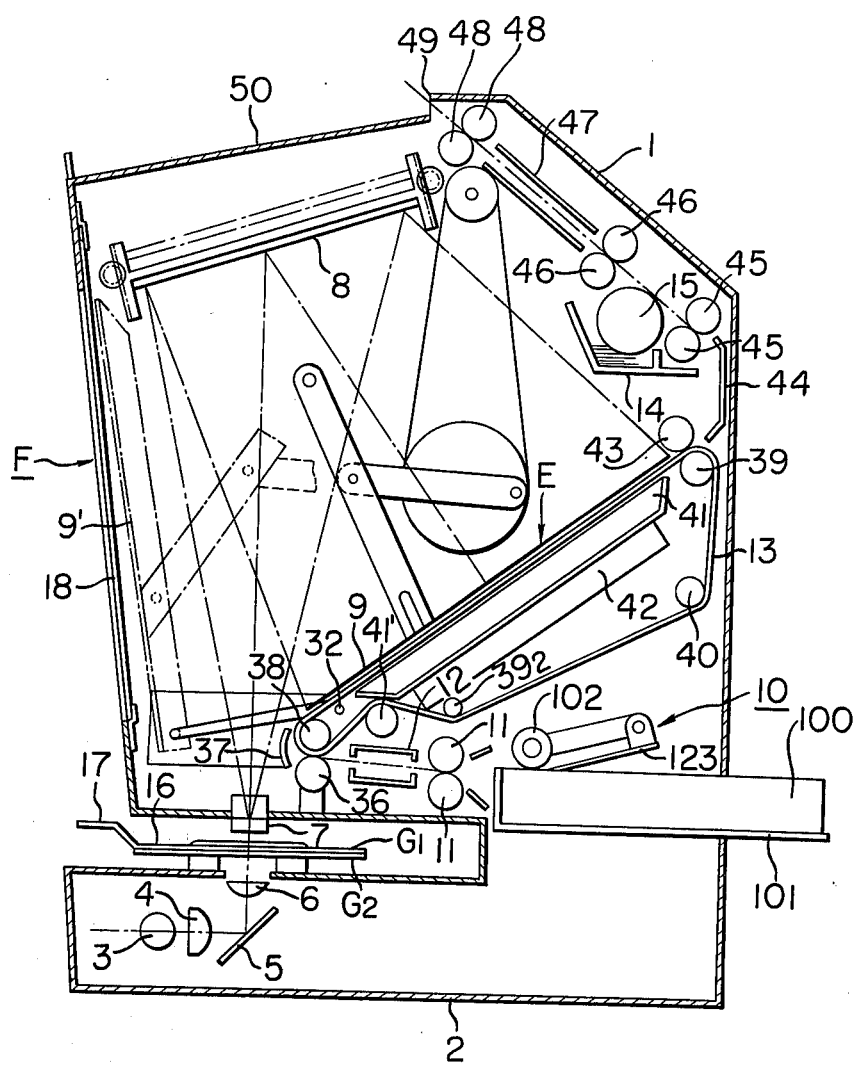
FIG. 1 is a schematic side elevational view in cross-section illustrating the apparatus of the invention incorporated in a reader-printer.

The present invention will now be described hereinbelow with reference to the accompanying drawing. FIG. 1 shows a reader-printer, in which the apparatus according to the present invention is utilized. The main body of the reader-printer is composed of an upper casing 1 and a lower casing 2. Within the lower casing 2, there is disposed illuminating means comprising a light source lamp 3, a converging lens 4, a reflection mirror 5, and another coverging lens 6. Within the upper casing 1, there are disposed projection optical means comprising a projection lens 7, and a reflection mirror 8; a reflection type screen 9 for receiving reflected light from the reflection mirror 8; printing means comprising paper feeding mechanism 10, feed rollers 11, charge 12, forwarding belt 13; and developing means comprising developer tank 14, and developing roller 15. The screen 9 is constituted by mounting a sheet having a light dispersion surface such as paper or the like on a rectangular frame, and is disposed generally within the casing in an inclinded manner. A carrier 16 which retains a pair of glass plates G1 and G2 to hold a micro-fiche between the converging lens 6 and the projection lens 7 is placed on the lower casing 2 in a movable manner. By operating a shift handle 17, the carrier 16 is shifted in the vertical and horizontal directions, as in FIG. 1, whereby the micro-fiche is displaced to bring a desired image the projection light path.

In the front face of the casing 1, there is formed an observation opening F smaller in size than the screen 9, at which portion a filter 18 is provided. The operator observes the reflected light from the screen 9 through the filter 18 thereby reading out the projected image. The filter 18 serves to correct the color temperature of the image and, at the same time, optimize the image contrast on the screen when the observer reads out the picture image on the reflection type screen 9 through the filter 18 disposed at the observation opening F. The reflection type screen 9 is connected with a shifting mechanism, by the operation of which it moves between the exposure section E and the observation opening F. When the screen 9 has moved to the opening F at a position 9' shown by chain lines in FIGS. 1, the moved screen 9' closes the opening F to shield the interior of the upper casing 1 from the external light to form a dark chamber. Incidentially, the interior of the upper casing is painted in black.

Electrophotographic copying sheets S are accommodated in a cassette 100 which is supported on a cassette receiving bed 101. For the copying sheets, the so-called electrofax paper prepared by coating base paper with zinc oxide is used. At the time of printing, a simple sheet of the copying paper S in the cassette 100 is forwarded between feed rollers 11, 11 by means of feed rollers 102. The copying paper S which has passed through the feed rollers 11, 11 is charged uniformly by the charger 12, after which it passes between the forwarding belt 13 and a guide roller 36, and led onto the surface of the forwarding belt 13 by means of a guide plate 37. The forwarding belt 13 is made in an endless form, and extended on rollers 38, $39_1$, $39_2$, and a driving roller 40. Reference numeral 41' designates a tension adjusting roller of the forwarding belt 13. Inside the forwarding belt 13, there is disposed a suction device 41 having a number of suction holes on the surface which faces the belt, and a blower 42 is connected with this suction device 41. When the copying paper S is guided to the surface of the forwarding belt 13, it is attracted to the surface of the forwarding belt 13, while being forwarded and further guided to the exposure section E where the screen 9 has been disposed.

While the screen 9 has a thickness of about 1 mm, and the copying paper S has a thickness of about 0.1 mm, both need not be subjected to the focussing operation, since they are within the range of the focal depth of the projection lens 7, when both screen and copying paper are disposed on the exposure section E. When the copying paper S is positioned on the exposure section E, the belt 13 stops its movement. The copying paper S is exposed to the picture image of a selected microfilm at the exposure section E, whereupon an electrostatic latent image corresponding to the picture image is formed. Upon completion of the exposure, the belt resumes its operation, and the copying paper S is guided by a guide plate 44 and introduced between the feed rollers 45, 45. The copying paper S which has passed through the feed rollers 45, 45 contacts the developing roller 15, and is applied on its one surface with a developing solution held on the peripheral surface thereof for the image development. Thereafter, it is guided between guide plates 47 through feed rollers 46, 46, and finally discharged into a tray 50 formed on top of the casing 1 through a discharge slot 49 of the casing 1 by means of sheet releasing rollers 48, 48. (Incidentally, detailed description of the image-forming process is omitted, as it is well known.)

Figure 2:
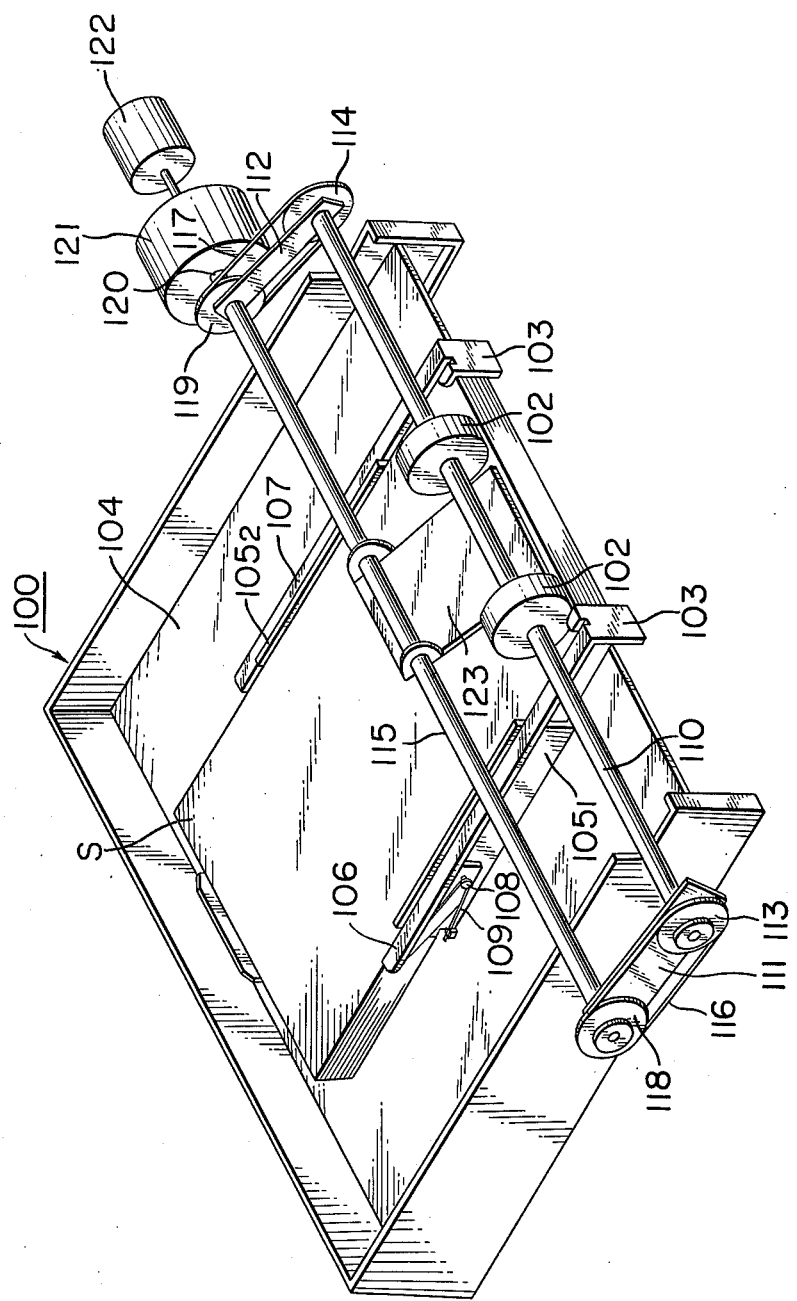
FIG. 2 is a perspective view showing feed rollers and a cassette.

FIG. 2 is a perspective view showing a cassette and feed rollers which contact the sheets of the copying paper in the cassette. The cassette is made of a plastic, metal, and other materials. FIG. 2 also shows a positional relationship of feed rollers and separation pawls with respect to the copying paper, when the cassette has been completely loaded on the reader-printer. The feed rollers 102 are placed on the top surface of the stack of the copying paper in the cassette, and the separation pawls 103 are provided at the top front edge of the paper stack. The feed rollers and the separation pawls rest on the uppermost sheet of the stack on its gravity or, are urged thereon by an appropriate mechanism. Loading of the cassette is carried out manually by an operator. The operator places the forward end of the cassette on the cassette receiving bed 100, and then causes the cassette to slide toward the feed rollers 102 until it reaches the accurate loading position shown in FIG. 1. In FIG. 2, a pair of L-shaped positioning plates $105_1$ and $105_2$ are mounted side by side on a paper receiving base plate 104. The copying sheets S are accommodated in a space defined by these cassette positioning plates $105_1$ and $105_2$. Levers 106 and 107 coupled to the separation pawls 103 are rotatably fitted to the outer vertical side surface of the positioning plates $105_1$ and $105_2$ by means of a shaft 108. The levers 106 and 107 are urged to oscillate in the clockwise direction around the shaft 108 by the force of a spring 109, and also act to urge the separation pawls 103 onto the corners of the sheet material for reproduction. The separation pawls 103 descend in accordance with decrease of copying sheets by energization of the spring 109. The shaft 110 of the feed rollers 102 is rotatably supported by arms 111 and 112. Sprocket wheels 113 and 114 are fitted on both ends of the shaft 110. The arms 111 and 112 are oscillatably supported on both ends of a stationary shaft 115, which in turn is mounted on the main body of the reader-printer, with the axis of the same as the center of rotation. Also, at both ends of the stationary shaft 115, there are mounted pulleys or sprocket wheels 118 and 119, and belts or chains 116 and 117 are extended between the sprocket wheels 118 and 119 and the sprocket wheels 113 and 114 mounted on both ends of the shaft 110, respectively.

A shaft 120 fixedly mounted on the sprocket wheel 119 is connected with a motor 122 through an electromagnetic clutch 121. When the clutch 121 is not in operation, the sprocket wheel 119 freely rotates. On the other hand, when the clutch 121 becomes operated, the driven shaft of the motor 122 is connected with the shaft 120 of the sprocket wheel 119 by the clutch 121, whereupon the sprocket wheel 119 rotates in accordance with rotation of the motor 122. Accordingly, when the clutch is not in operation, the feed rollers 102 freely rotate, and when the clutch becomes actuated, the feed rollers 102 rotate in synchronism with rotation of the motor 122 to feed a sheet of paper from the cassette. A lever 123 is also oscillatably supported on the stationary shaft 115 with the axis of the same as the center of oscillator, the free end of the lever 123 hanging down on its own gravity.

Figure 3:
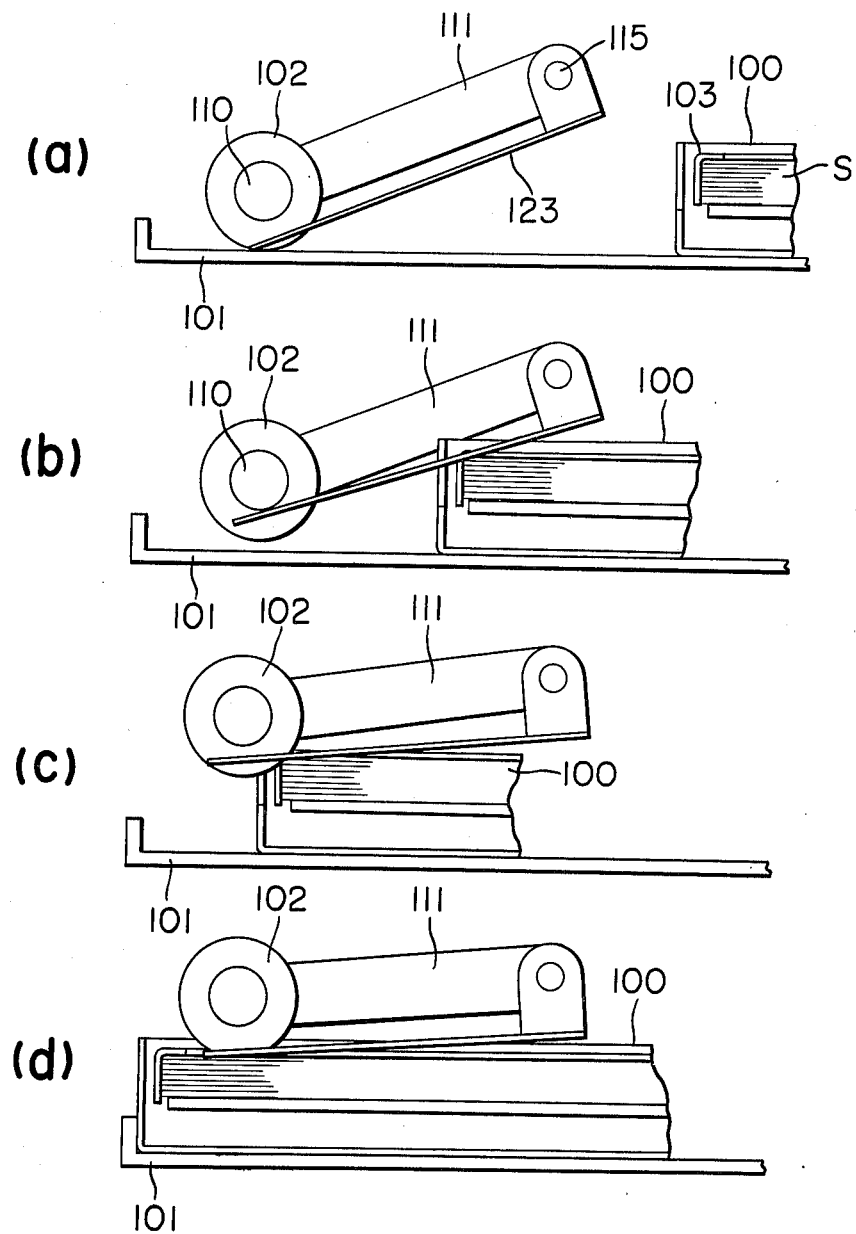
FIGS. 3(a) through 3(d) are side elevational views respectively illustrating the operating states of the apparatus according to the invention.

FIGS. 3(a) through 3(d) show, respectively, the operational states of the cassette loading mechanism for automatically determining the position of the feed rollers 102 when the cassette is being loaded in the reader-printer. In FIG. 3(a), the cassette 100 slides along the upper surface of the cassette receiving bed 101 fitted to the main body of the reader-printer. That is, when the cassette is not loaded, the feed rollers 102 supported by the arms 111 and 112 and the free end of the lever 123 pivotally supported on the stationary shaft 115 rest on the upper surface of the cassette receiving bed 101 by their own gravity, i.e., they are placed on the passageway, along which the cassette moved. Therefore, when the cassette is not present in this cassette loading mechanism, a state as shown in FIG. 3(a) is assumed.

When the cassette 100 is inserted into the cassette loading mechanism from the right-hand entrance thereof along the upper surface of the cassette receiving bed 101, and further shifted in the leftward direction, the front edge of the top sheet S in the cassette comes into contact with a part of the lever 123. As the cassette moves leftward, the lever 123 oscillates in the clockwise direction with the stationary shaft 115 as the center of oscillation, whereby the free end of the lever 123 is finally lifted. When the lever 123 is further oscillated, the free end of the lever comes into contact with the shaft 110 of the feed rollers 102, whereby the feed rollers 102 are gradually raised to assume the state shown in FIG. 3(b). When the feed roller 102 is further lifted and the rotational center of the feed rollers lowers in the vertical direction to reach a place on the uppermost paper in the cassette, the front edge of the paper in the cassette comes into contact with the peripheral surface of the feed roller to assume the state shown in FIG. 3(c). Since the electromagnetic clutch 121 is inoperative until the cassette is completely loaded into the cassette loading mechanism, when the front edge of the paper comes into contact with the peripheral surface of the feed rollers 102, the feed rollers are further lifted, while rotating in the clockwise direction around the shaft 110 as the center of rotation. When the cassette moves until the front edge of the paper reaches the lowermost end of the feed rollers 102, the feed rollers 102 are lifted on the upper surface of the uppermost paper, and then rotate, while contacting the upper surface of the paper. Subsequently, when the cassette reaches the feeding end portion of the cassette receiving bed 101, at the extreme left end thereof, the cassette stops its movement to assume a state shown in FIG. 3(d), whereby the feed rollers 102 contact the top sheet of the copying paper in the cassette to bring the same in a state of being ready for feeding. In this case, the lever 123 rests on the paper by its own gravity. When the clutch is actuated in this state, the feed rollers 102 rotate to deliver one sheet of paper out of the cassette.

Although the invention has been described with particularity in the foregoing, it is not limited to the disclosed embodiment alone, but any change and modification may be made within the spirit and scope of the invention as recited in the appended claims.

What is claimed is:

1. A cassette loading apparatus for receiving a cassette supplied with a stack of sheet material, comprising:
    cassette supporting means for holding the cassette in a supply position and for defining a path along which the cassette is slidably received in said supply position;
    roller means for discharging sheet material from the cassette while the cassette is in its said supply position, wherein said roller means is movably mounted in said cassette path when the cassette is removed from said supporting means; and
    lifting means positioned in said cassette path and movably mounted for lifting said roller means upwardly, while the cassette is moved along said path toward its said supply position, until the center of rotation of said roller means is disposed above the topmost sheet of paper in the cassette and said roller means contacts the stack of sheet material, wherein said roller means then rotates in contact with the sheet material and moves into engagement with the topmost sheet in the cassette as the cassette is moved further along said path toward its said supply position.

2. A cassette loading apparatus as set forth in claim 1, further comprising means disposed on the cassette for separating the sheet material one at a time from a stack of said sheet material in the cassette in response to operation of said roller means.

3. A cassette loading apparatus as set forth in claim 2, wherein said cassette includes guide means for engaging the sides of the stack of sheet material, and said sheet material separating means is pivotally held on said guide means.

4. A cassette loading apparatus as set forth in claim 1, further comprising a driving source for said roller means, and clutch means interconnecting said roller means with said driving source.

5. In a reproduction apparatus, a device for automatically positioning sheet material forwarding means at an operating position with respect to a stack of sheet material in a cassette, while loading the cassette in the apparatus, comprising:
    means mounted on the apparatus for holding the cassette in a sheet supplying position and for defining a path along which the cassette is slidably received in said supply position;
    sheet material advancing means for being disposed in an operating position to supply sheet material to the apparatus from the cassette while the cassette is in its said supply position, wherein said advancing means includes a roller movably mounted in said cassette path when the cassette is removed from said supporting means; and
    lifting means positioned in said cassette path and movably mounted for lifting said advancing means upwardly, while the cassette is moved along said path toward its said supply position, until the center of rotation of said roller is disposed above the topmost sheet of paper in the cassette and said roller contacts the stack of sheet material, wherein said roller then rotates in contact with the sheet material and moves into engagement with the topmost sheet in the cassette as the cassette is moved further along said path toward its said supply position.

6. A device for automatcially positioning sheet material forwarding means as set forth in claim 5, further comprising a pair of spaced support arms, and a shaft for rotatably connecting said roller to free ends of said support arms, wherein the other ends of said support arms are pivotally connected to said apparatus; and a lever pivotally mounted at one end to said apparatus and having its other end disposed to lift said shaft and roller in response to an upward pivotal force exerted thereon when the cassette is moved toward said supply position.

7. A device for observing a micro-image and for reproducing the same, including lens means to enlarge and project the micro-image, a screen to receive the projected micro-image, and means including a copy material advancing device comprising: a cassette for storing a stack of sheets of copy material; means fixed to said apparatus for holding said cassette in a supply position; roller means for feeding said sheet material from said cassette to a copying position; and lifting means disposed on said cassette holding means for lifting said roller means while the cassette is moved toward said supply position, until the center of rotation of said roller means is disposed above the topmost sheet of material in said cassette, wherein said roller means then rotates in contact with the sheet material and moves into engagement with the topmost sheet in the cassette as the cassette is moved further along said path toward its said supply position.

* * * * *